United States Patent
Lee et al.

(10) Patent No.: US 7,219,169 B2
(45) Date of Patent: May 15, 2007

(54) COMPOSITE DMA DISK CONTROLLER FOR EFFICIENT HARDWARE-ASSISTED DATA TRANSFER OPERATIONS

(75) Inventors: Whay Sing Lee, Newark, CA (US); Raghavendra Rao, Fremont, CA (US); Satyanarayana Nishtala, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/261,799

(22) Filed: Sep. 30, 2002

(65) Prior Publication Data

US 2004/0064600 A1    Apr. 1, 2004

(51) Int. Cl.
*G06F 13/28* (2006.01)
*G06F 12/00* (2006.01)

(52) U.S. Cl. ............... 710/22; 710/23; 710/24; 710/25; 710/26; 710/27; 710/28; 710/74; 711/114

(58) Field of Classification Search ............... 710/22, 710/23, 25, 26, 27, 28, 24, 74; 711/114
See application file for complete search history.

(56) References Cited

U.S. PATENT DOCUMENTS

| | | | | |
|---|---|---|---|---|
| 4,723,223 A | * | 2/1988 | Hanada | 710/26 |
| 4,797,755 A | * | 1/1989 | Baldwin et al. | 360/49 |
| 5,251,303 A | * | 10/1993 | Fogg et al. | 710/24 |
| 5,473,761 A | * | 12/1995 | Parks et al. | 711/4 |
| 5,675,726 A | * | 10/1997 | Hohenstein et al. | 714/6 |
| 5,729,705 A | * | 3/1998 | Weber | 710/315 |
| 6,018,778 A | * | 1/2000 | Stolowitz | 710/61 |
| 6,021,462 A | | 2/2000 | Minow et al. | |

(Continued)

FOREIGN PATENT DOCUMENTS

| | | | |
|---|---|---|---|
| EP | 0589664 A1 | * | 3/1994 |
| JP | 04295946 | * | 10/1992 |

OTHER PUBLICATIONS

IBM Technical Disclosure Bulletin, Sep. 1988, vol. 31, Issue No. 4, pp. 478-480. Realtime Hardware Redirection of Disk Data into Multiple Noncontiguous Cache Memory Pages.*
Drew Robb, "Defragmenting really speeds up WINDOWS NT machines", IEEE Spectrum, Sep. 2000.*
White, Ron; How Computers Work; 2002; Que; Sixth Edition, p. 134-135.*
"How SCSI Works", www.howstuffworks.com & Raid tutorial by AC&NC.*
Wikipedia.com->Redundant array of independent disks.*

*Primary Examiner*—Kim Huynh
*Assistant Examiner*—Alan Chen
(74) *Attorney, Agent, or Firm*—Dorsey & Whitney LLP

(57) ABSTRACT

In one embodiment, a direct memory access (DMA) disk controller used in hardware-assisted data transfer operations includes command receiving logic to receive a data transfer command issued by a processor. The data transfer command identifies one or more locations in memory and multiple distinct regions on one or more disks accessible to the DMA disk controller. The DMA disk controller further includes data manipulation logic to transfer data between the memory locations and the distinct regions on the disks according to the data transfer command.

20 Claims, 7 Drawing Sheets

U.S. PATENT DOCUMENTS

| | | | |
|---|---|---|---|
| 6,105,080 A * | 8/2000 | Holt et al. .................... 710/26 |
| 6,108,724 A * | 8/2000 | Din ............................ 710/52 |
| 6,151,641 A | 11/2000 | Herbert | |
| 6,341,331 B1 | 1/2002 | McNutt | |
| 6,425,052 B1 * | 7/2002 | Hashemi .................... 711/114 |
| 6,425,053 B1 * | 7/2002 | Considine et al. .......... 711/114 |
| 6,484,234 B1 * | 11/2002 | Kedem ....................... 711/113 |
| 6,640,274 B1 * | 10/2003 | Huffman et al. ............ 710/260 |
| 2003/0084212 A1 * | 5/2003 | Butterfield .................... 710/22 |
| 2004/0064600 A1 * | 4/2004 | Lee et al. ..................... 710/22 |

* cited by examiner

COMPOSITE DMA DISK CONTROLLER FOR EFFICIENT HARDWARE-ASSISTED DATA TRANSFER OPERATIONS

FIELD OF THE INVENTION

This invention relates generally to data storage arrays and more particular to a composite direct memory access (DMA) disk controller for efficient hardware-assisted data transfer operations.

BACKGROUND OF THE INVENTION

Computer systems typically include a processor, main memory and secondary storage memory. The processor is, for example, a central processing unit (CPU) or a microprocessor. The main memory is normally random access memory (RAM), and the secondary storage is typically a hard disk drive. When the processor wants to make use of data stored in the secondary storage memory, the data is moved from the hard disk drive into the main memory. Normally, the data would be moved from the hard disk drive into the main memory in units of blocks. Because the transferring of blocks of data in this manner to and from the hard disk drive and the main memory is time consuming, computer systems have used a Direct Memory Access (DMA) disk controller to oversee the transferring of data. Typically, the DMA disk controller receives information from the processor indicating a base address from where bytes are to be moved, an address to where these bytes should be placed, and the number of bytes to be moved. The DMA disk controller is then able to monitor and oversee the transferring of the data, thus freeing the processor to perform other processing tasks.

Some computer systems use a series of secondary storage devices such as a Redundant Array of Inexpensive Disks (RAID) to store data. With a RAID design, a RAID controller instructs a DMA disk controller to transfer data between a local memory location and a disk location. The DMA disk controller establishes a direct data path between the local memory and the disk array, allowing the RAID controller central processing unit (CPU) to perform other tasks while the data exchange occurs in parallel.

Conventional DMA disk controllers are capable of transferring data between one or more memory locations and a contiguous region of a disk drive. Specifically, a DMA disk controller is capable of "gathering" data from noncontiguous memory locations according to a "gather list" provided by a RAID controller and writing the collected data to a single contiguous region of a single disk drive. In addition, the DMA disk controller is capable of reading data from a single contiguous region of a single disk drive and "scattering" this data over non-contiguous memory locations according to a "scatter list" provided by the RAID controller.

Some RAID operations involve data transfers between multiple memory locations and multiple distinct disk locations. Currently, no mechanism exists for performing such data transfers in an efficient way. In particular, a RAID controller has to issue a separate command for each distinct disk location involved in the required data transfer. For example, in order to destage a RAID-5 strip containing 'N' number of data chunks (i.e., components that form a RAID stripe) and a parity data chunk, the RAID controller must issue a total of N+1 distinct write commands to the DMA disk controller. Furthermore, because there is a possibility that any of these write commands can fail or be interleaved with other operations, the RAID controller has to take additional upper-level precautions to monitor the execution of these write commands and ensure that the related data transfers appear atomic to the system.

SUMMARY OF THE INVENTION

The present invention relates to various aspects of a direct memory access (DMA) disk controller used in hardware-assisted data transfer operations.

In one aspect of the invention, a DMA disk controller includes command receiving logic to receive a data transfer command issued by a processor. The data transfer command identifies one or more locations in memory and multiple distinct regions on one or more disks accessible to the DMA disk controller. The DMA disk controller further includes data manipulation logic to transfer data between the memory locations and the distinct regions on the disks according to the data transfer command.

Other features and advantages of the present invention will be apparent from the accompanying drawings, and from the detailed description, that follows below.

BRIEF DESCRIPTION OF THE DRAWINGS

The present invention is illustrated by way of example, and not limitation, by the figures of the accompanying drawings in which like references indicate similar elements and in which.

DETAILED DESCRIPTION

As will be discussed in more detail below, an embodiment of the present invention provides a direct memory access (DMA) disk controller that is operable to execute a command to transfer data between multiple locations in memory and multiple distinct regions on one or more disks accessible to the DMA disk controller. In another embodiment of the present invention, a DMA disk controller is operable to execute a command to transfer data from a set of source locations to a set of destination locations, with either the set of source locations or the set of destination locations (or each of the two sets) including a combination of one or more memory locations and one or more distinct disk locations. In yet another embodiment of the present invention, a DMA disk controller is operable to refrain from writing data to a specific destination location when performing a data transfer command if this destination location is identified by a no-capture specifier in a list of destination locations associated with the data transfer command.

In the following detailed description of the present invention, numerous specific details are set forth in order to provide a thorough understanding of the present invention. However, it will be apparent to one skilled in the art that the present invention may be practiced without these specific details. In some instances, well-known structures and devices are shown in block diagram form, rather than in detail, in order to avoid obscuring the present invention.

Figure 1:
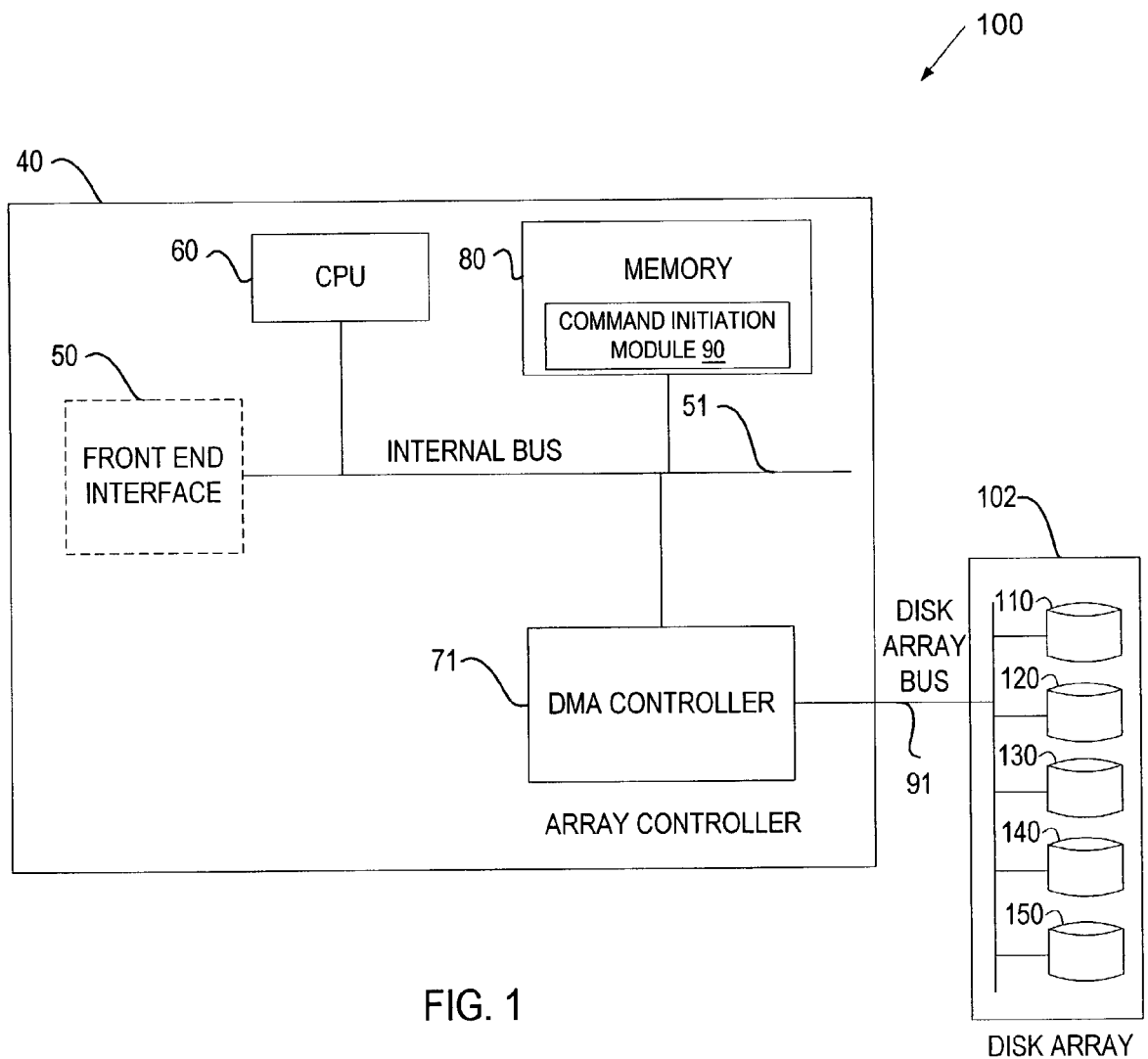
FIG. 1 is a block diagram of an exemplary data storage system in accordance with one embodiment of the present invention.

FIG. 1 is a block diagram of an exemplary data storage system 100 in accordance with one embodiment of the present invention. The data storage system 100 includes an array controller 40 and a disk array 102 coupled to the array controller 40 via a disk array bus (e.g., a fiber channel bus, a SCSI bus, or any other disk array bus). The data storage system 100 may be a part of a client computer or a server. Alternatively, the data storage system 100 may be an independent system coupled to a host system via a network or directly via a system interface bus such as a PCI bus.

The disk array 102 is composed of one or more sets of storage devices (e.g., redundancy groups) such as disks 110 through 150 that may be magnetic or optical storage media or any other fixed-block storage media, such as memory cells. Data in disks 115–119 is stored in blocks (e.g., data blocks of 512-bytes in lengths).

The array controller 40 controls the operation of the disk array 102. The array controller 40 includes one or more processors 60, memory 80 and a DMA disk controller 71, coupled via an internal bus 51 (e.g., a PCI bus). Memory 80 may be random access memory (RAM) or some other machine-readable medium, for storing program code (e.g., software for performing any method of the present invention such as a command initiation module 90) that may be executed by processor 60. The machine-readable medium may include a mechanism that provides (i.e., stores and/or transmits) information in a form readable by a machine such as a computer or digital processing device. For example, a machine-readable medium may include a read only memory (ROM), random access memory (RAM), magnetic disk storage media, optical storage media, flash memory devices, etc. The code or instructions may be represented by carrier-wave signals, infrared signals, digital signals, and by other like signals.

In one embodiment, the memory 80 includes a cache for caching data stored in disks 110 through 150 of the disk array 102.

The DMA disk controller 71 performs data transfers between the memory 80 and the disk array 102 under the direction of the array controller 40.

In one embodiment, the array controller 40 includes a front end interface 50 to provide an interface between the array controller's internal bus 51 and a bus of an external system (e.g., a host system).

The array controller 40 includes a command initiation module 90, which may be implemented in hardware, software, or a combination of both. In one embodiment, in which the command initiation module 90 is implemented in software, it is stored in the memory 80.

The command initiation module 90 is responsible for issuing data transfer commands that are to be executed by the DMA disk controller 71. In one embodiment, a command issued by the command initiation module 90 requests a transfer of data between a set of locations in the memory 80 and a set of distinct locations on one or more disks within the disk array 102. For example, the command initiation module 90 may issue a command to write data stored in the memory 80 onto distinct regions on one or more disks within the disk array 102. Similarly, the command initiation module 90 may issue a command to read data from distinct regions on one or more disks within the disk array 102 to memory locations.

For each data transfer command, the command initiation module 90 identifies a set of source locations and a set of destination locations and specifies a number of data blocks to be transferred. In one embodiment, either the set of source locations or the set of destination locations includes a combination of disk locations and memory locations. In another embodiment, each of the set of source locations or the set of destination locations includes a combination of disk locations and memory locations.

In one embodiment, the command initiation module 90 also provides a target location for storing parity data (e.g., an XOR value) for data to be transferred. The target location for parity data may be in the memory 80 or on any disk within the disk array 102.

In one embodiment, any of the destination locations (including the target location for the parity data) may be identified by a no-capture specifier indicating a request not to store corresponding data in this destination location.

The DMA disk controller 71 is responsible for receiving a data transfer command issued by the command initiation module 90 and performing the requested data transfer according to the command. In one embodiment, the DMA disk controller 71 transfers data between memory locations and distinct locations on disk within the disk array 102. In another embodiment, the DMA disk controller 71 transfers data from a combination of source disk and memory locations to a combination of destination disk and memory locations.

In one embodiment, the DMA disk controller 71 is also responsible for calculating parity data (e.g., an XOR value) for data being transferred and storing the parity data in a target location in the memory 80 or on a disk within the disk array 102.

In one embodiment, the DMA disk controller 71 is configured to refrain from writing data to a destination location identified by a no-capture specifier as will be discussed in more detail below.

Figure 2:
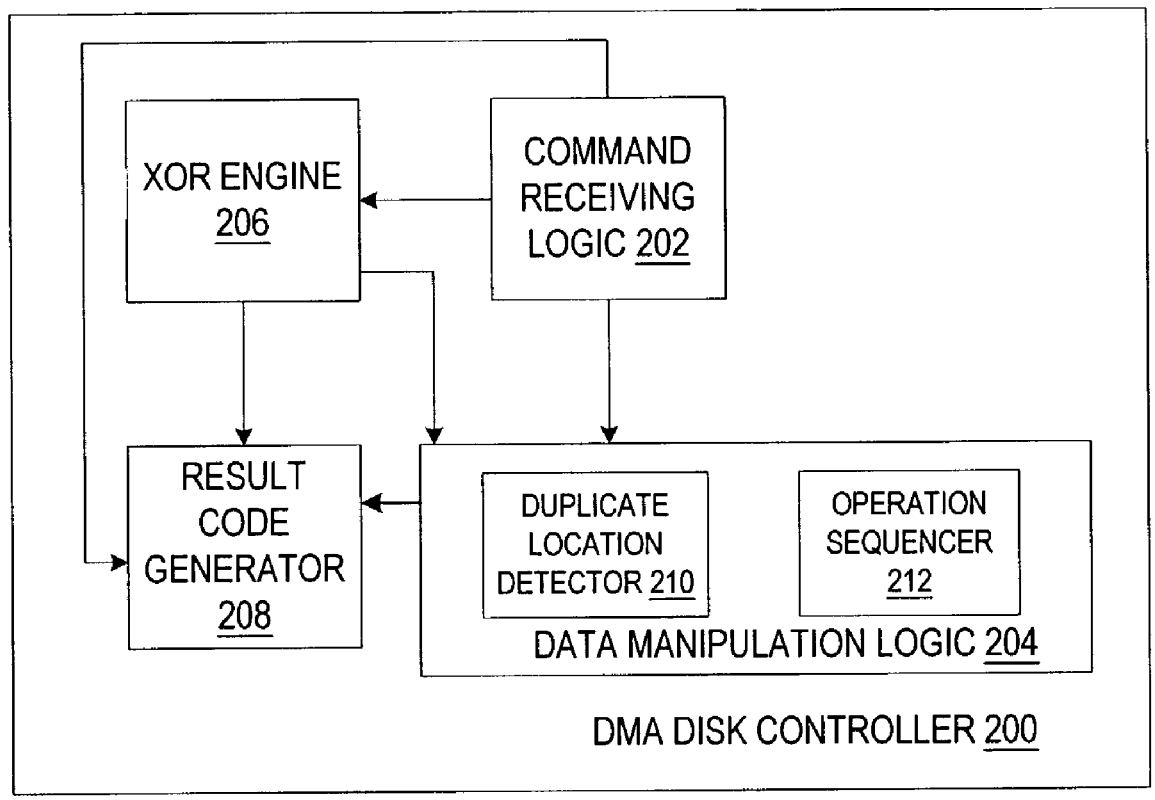
FIG. 2 is a block diagram of one embodiment of a direct memory access (DMA) disk controller.

FIG. 2 is a block diagram of one embodiment of a DMA disk controller 200. The DMA disk controller 200 includes command receiving logic 202, data manipulation logic 204, an XOR engine 206, and a result code generator 208. Note that each of these elements can be embodied in either hardware, software, or a combination thereof. For example, each of these modules could be embodied as one or more hardwired integrated circuit (IC) devices, such as application specific integrated circuits (ASICs), gate arrays, programmable logic devices (PLDs), or the like. If these elements are software modules, they will be executed by a programmable microprocessor or controller (not shown) within the DMA disk controller 200.

The command receiving logic 202 is responsible for receiving a data transfer command and identifying a set of source locations, a set of destination locations, and a number of data blocks associated with each location.

The data manipulation logic 204 is responsible for executing the data transfer command by collecting data from the source locations and distributing data to the destination locations. In one embodiment, the data manipulation logic 204 performs a transfer of data between a set of memory locations and a set of non-contiguous disk locations in accordance with the data transfer commands. In another embodiment, the data manipulation logic 204 performs a transfer of data between a combination of source disk locations and memory locations and either a set of destination memory locations or one or more disk locations, according to the data transfer command. In yet another embodiment, the data manipulation logic 204 performs a transfer of data between a combination of source disk locations and memory locations and a combination of destination disk locations and memory locations.

In one embodiment, the data manipulation logic 204 includes a duplicate location detector 210 which is responsible for detecting that a source location or destination location is specified multiple times and skipping reading from, or writing to, a duplicate location for higher efficiency. In one embodiment, the duplicate location detector 210 can be turned on or off. In particular, the duplicate location detector 210 will be turned off if the array controller requires that accesses to the repeated locations be carried out in accordance with certain I/O functionality.

In one embodiment, the data manipulation logic 204 also includes an operation sequencer 212 which is responsible for determining a sequence of location accesses. That is, rather than following the order in which the source locations and the destination locations are specified by the array controller, the operation sequencer 212 defines a different order for executing individual read/write operations. For example, if the set of source locations includes a combination of disk locations and memory locations, the operation sequencer 212 may decide to issue all read requests to the disk locations before issuing read requests to the memory locations, in order to mask the longer latency of disk operations. In one embodiment, the operation sequencer 212 can be turned on or off. That is, the operation sequencer 212 will be turned off if the array controller requires the operations to be executed in strict order to satisfy certain I/O functionality.

The XOR engine 206 is responsible for calculating parity data for the data being transferred. In one embodiment, the parity data is calculated if a target location for the parity data is identified by a location specifier other than a no-capture specifier (i.e., a NULL specifier). In one embodiment, the XOR engine 206 creates two sets of parity data for the data being transferred (e.g., an XOR value and an inverted value of the XOR value). The XOR engine 206 may create two sets of parity data if two target locations are provided with the data transfer command and each of the two target locations is identified by a location specifier other than a no-capture specifier.

The result code generator 208 is responsible for generating a result code indicating whether the requested data transfer has completed successful. If the requested data transfer fails, the result code generator 208 generates an error code. In one embodiment, the result code generator 208 also creates information identifying the source and/or destination location that caused the failure.

Figure 3:
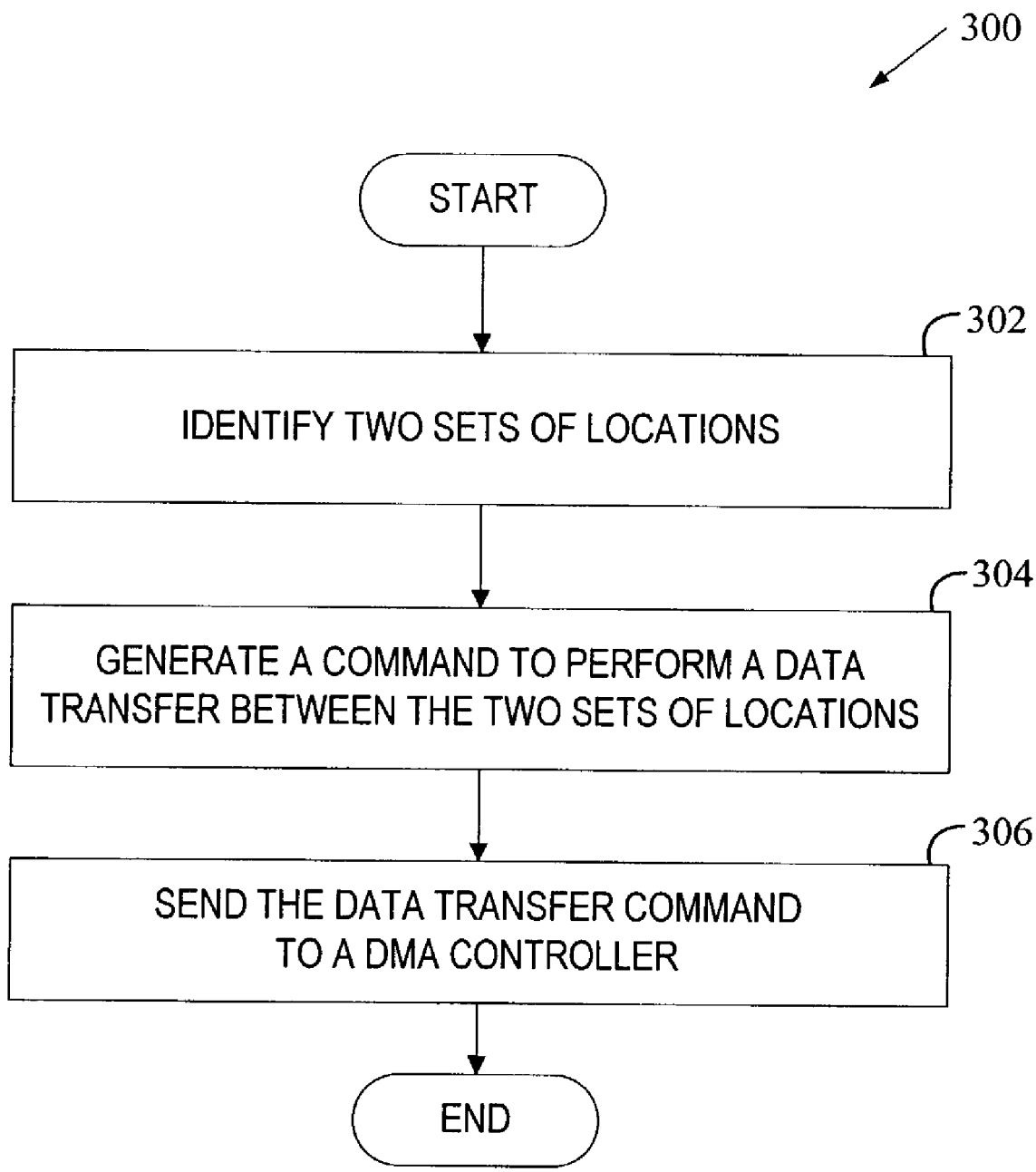
FIG. 3 is a flow diagram of one embodiment of a method for issuing a data transfer command to a DMA disk controller.

FIG. 3 is a flow diagram of one embodiment of a method 300 for issuing a data transfer command to a DMA disk controller. The method may be performed by processing logic that may comprise hardware (e.g., circuitry, dedicated logic, etc.), software (such as run on a general purpose computer system or a dedicated machine), or a combination of both.

Method 300 begins with processing logic identifying two sets of locations (processing block 302). In one embodiment, a first set of locations is a set of memory locations and a second set of locations is a set of distinct locations on one or more disks. In another embodiment, a first set of locations includes a combination of disk locations and memory locations and a second set of locations includes one or more memory locations or one or more disk locations. In yet another embodiment, each of the two sets of locations includes a combination of disk locations and memory locations.

At processing block 304, processing logic generates a command to perform a data transfer between the two sets of locations. The data transfer command may be a write command or a read command. In one embodiment, the data transfer command identifies the size L of a data block used for data transfers (the data-transfer block), with L=N*S where N is an integer and S is the native disk block size which may vary for different data storage systems. The data transfer command also specifies a set of source locations and a number of data blocks to be collected from each source location, and a set of destination locations and a number of data blocks to be distributed to each destination location. A total number of data blocks to be collected from the source locations and a total number of data blocks to be distributed to the destination locations are equal to M*L where M is an integer and L is the size of the data-transfer block. In one embodiment, the data transfer command also identifies one or more target locations for one or more sets of parity data. The size of each set of parity data is equal to the size of the data-transfer block. In one embodiment, any destination location for data being transferred and any target location for parity data can be identified by a no-capture specifier which indicates that no data is to be written to this destination location.

At processing 306, processing logic sends the data transfer command to the DMA disk controller.

Figure 4:
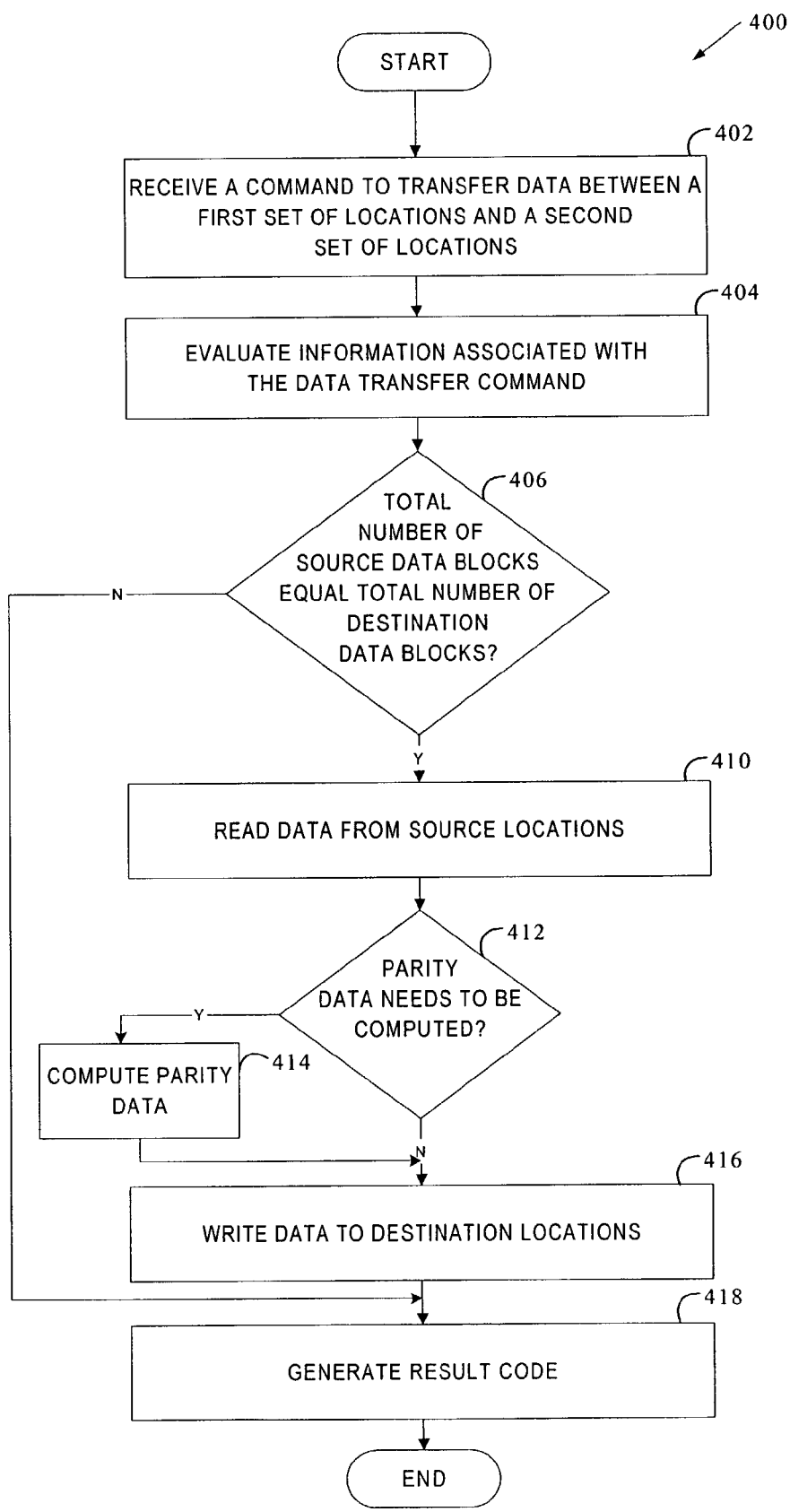
FIG. 4 is a flow diagram of one embodiment of a method for operating a DMA disk controller.

FIG. 4 is a flow diagram of one embodiment of a method 400 for operating a DMA disk controller. The method may be performed by processing logic that may comprise hardware (e.g., circuitry, dedicated logic, etc.), software (such as run on a general purpose computer system or a dedicated machine), or a combination of both.

Method 400 begins with processing logic receiving a command to transfer data between two sets of locations from an array controller (e.g., a RAID controller) (processing block 402). In one embodiment, a first set of locations is a set of memory locations and a second set of locations is a set of distinct locations on one or more disks. In another embodiment, a first set of locations includes a combination of disk locations and memory locations and a second set of locations includes one or more memory locations or one or more disk locations. In yet another embodiment, each of the two sets of locations includes a combination of disk locations and memory locations.

Next, processing logic evaluates the information associated with the data transfer command (processing block 404). In one embodiment, this information identifies a set of source locations and a number of data blocks to be collected from each source location, and a set of destination locations and a number of data blocks to be written to each destination location. In one embodiment, the information associated with the data transfer command also includes a target location specifier for parity data to be computed for the data blocks read from the source locations. The target location specifier may be a disk location specifier or a memory location specifier.

In one embodiment, any destination location (including a target location for parity data) may be identified by a no-capture specifier (e.g., a NULL specifier) indicating that data is not to be written to this destination location.

At decision box 406, processing logic determines whether the total number of data blocks associated with the source locations is equal to the total number of data blocks associated with the destination locations. If this determination is negative, processing logic proceeds to processing block 418 at which a result code indicating an error is generated. Otherwise, method 400 continues with processing logic reading data from the source locations (processing block 410). In one embodiment, processing logic detects a duplicate source location and skips reading data from the duplicate source location for higher efficiency. In one embodiment, processing logic reads data from the source locations in a specified order. In another embodiment, processing logic defines the order for reading the data (e.g., reading data from all disk locations first and then from the memory locations) and reads the data in the defined order.

In one embodiment, in which the DMA disk controller includes a parity data engine (e.g., an XOR engine), processing logic also determines whether parity data is to be computed (decision box 412). This determination is based on values of target location specifiers. That is, parity data is to be computed for each target location having a location specifier other than a no-capture specifier. If the determination made at decision box 412 is positive, processing logic computes parity data for each target location having a location specifier other than a no-capture specifier (processing block 414).

Further, processing logic distributes the collected data (and, in one embodiment, parity data) to the destination locations (processing block 416). In one embodiment, processing logic detects a duplicate destination location and skips writing data to the duplicate destination location. In one embodiment, processing logic writes the collected data in the order in which the destination locations are listed. In another embodiment, processing logic follows a different order which is defined when the data is read from the source locations. In one embodiment, once processing logic detects a destination location identified by a no-capture specifier, processing logic refrains from writing data blocks collected from a corresponding source location, i.e., it skips the data blocks collected from the corresponding source location and continues with writing next data blocks to a destination location following the destination location with the no-capture specifier.

Afterwards, processing logic generates a result code indicating whether the data transfer has completed successfully (processing block 418). If the data transfer was unsuccessful, an error code is generated. In one embodiment, information identifying the source/destination location that caused the failure is also created.

Figure 5A:
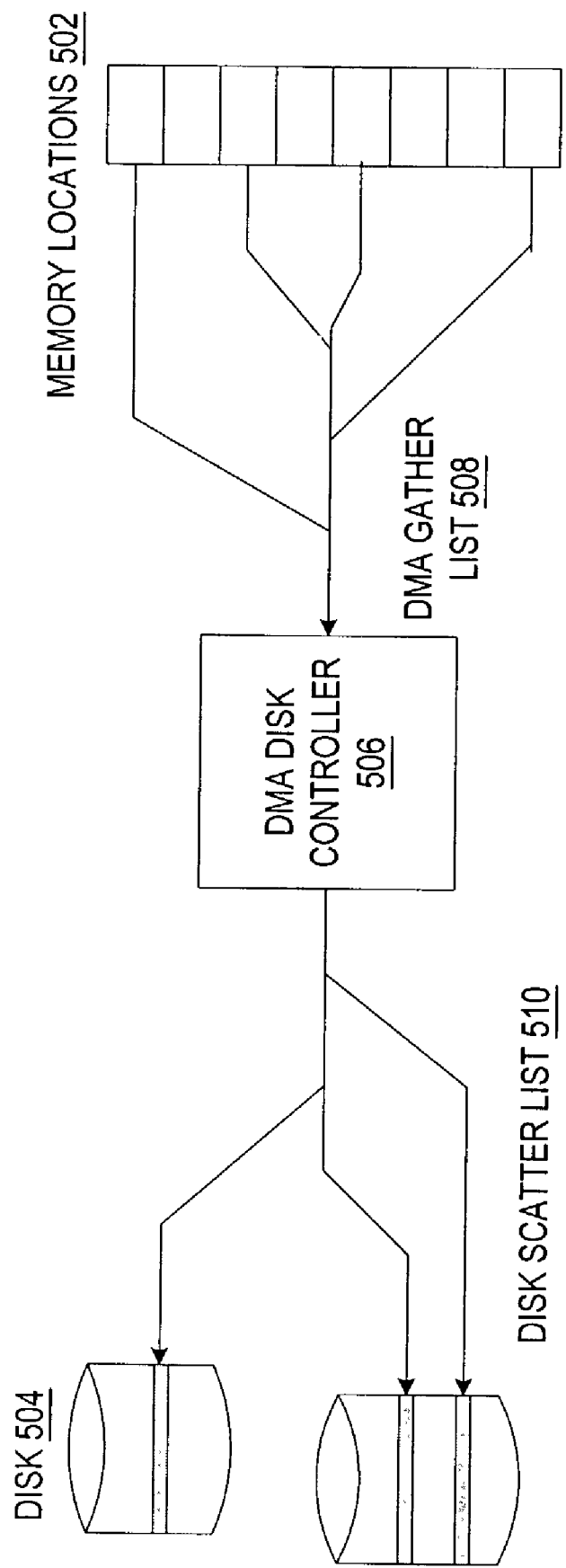
FIGS. 5A–5C illustrate execution of data transfer commands by a DMA disk controller, according to alternative embodiments of the present invention.
Figure 5B:
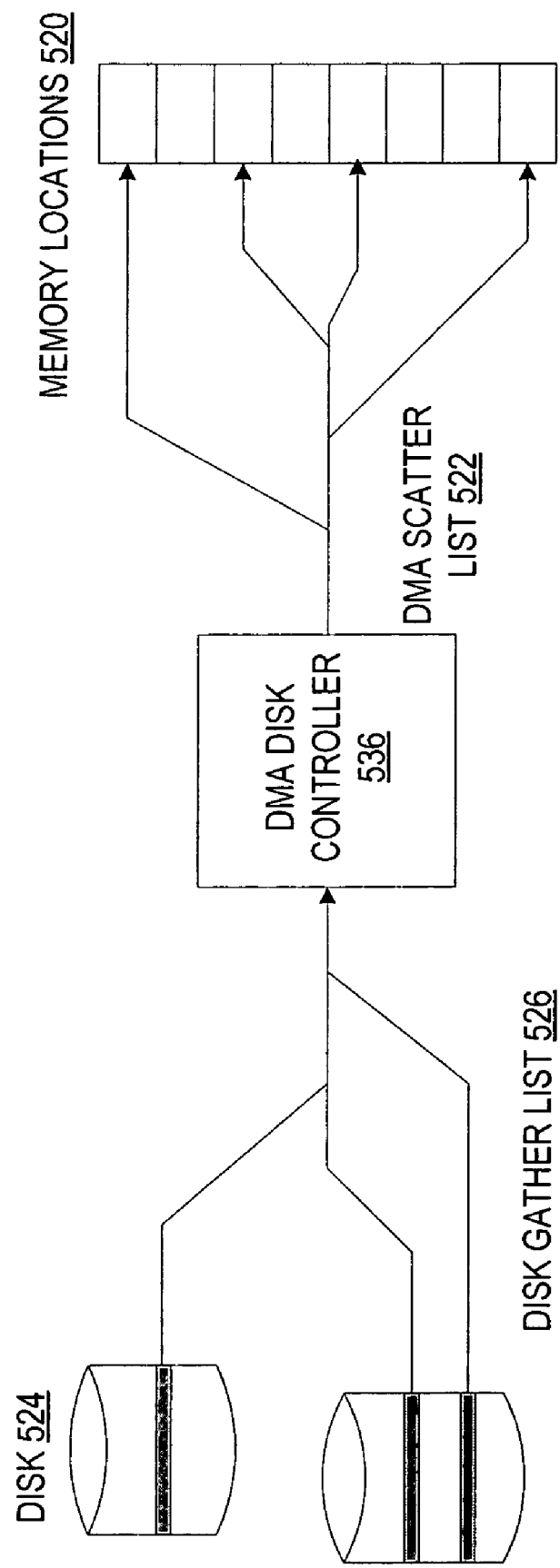
Figure 5C:
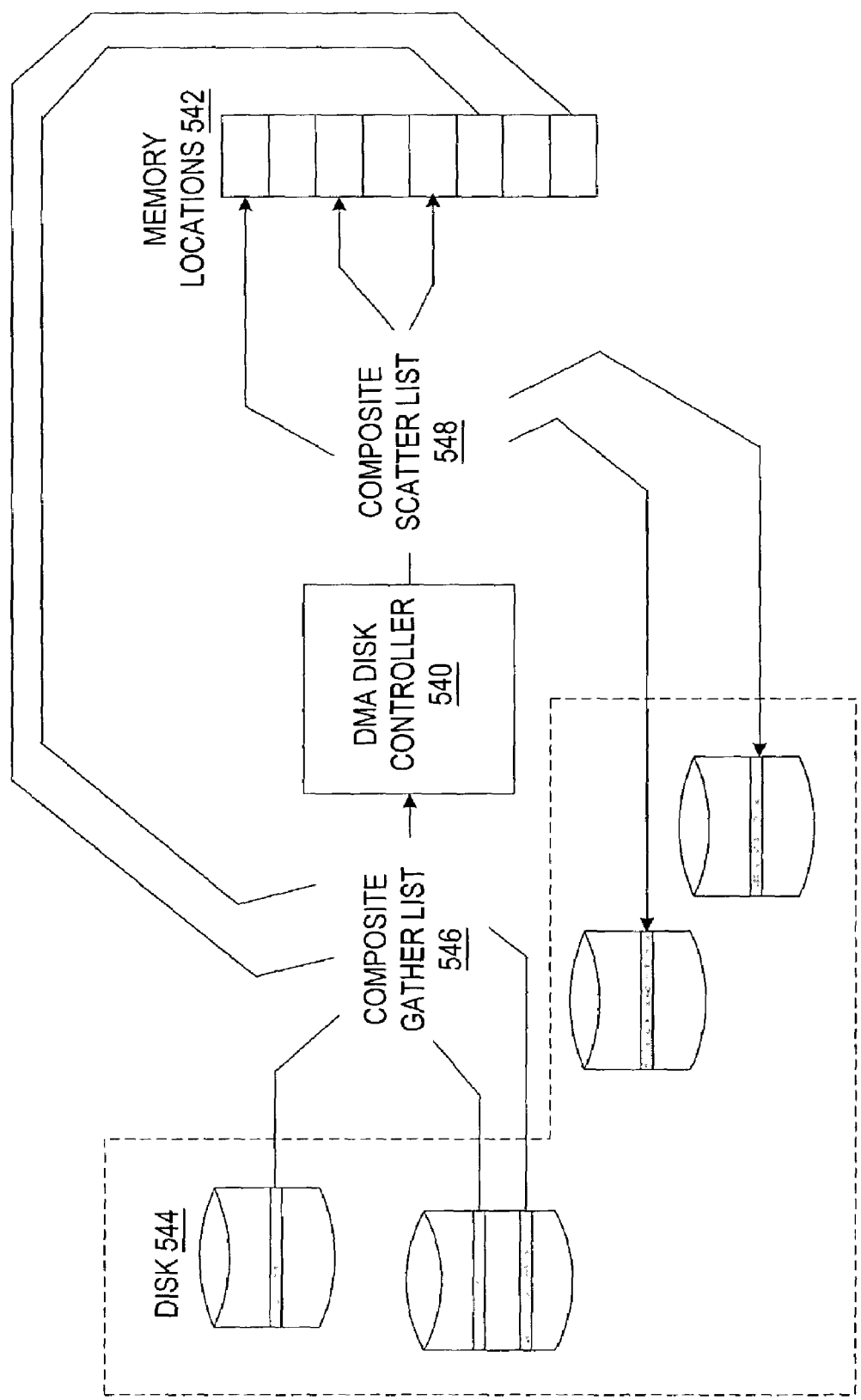

FIGS. 5A–5C illustrate execution of data transfer commands by a DMA disk controller, according to some embodiments of the present invention.

Referring to FIG. 5A, a DMA disk controller 506 receives a write command identifying a list of source locations in memory 502 with a number of data blocks to be collected from each source location and a list of destination locations on disks 504 with a number of data blocks to be written to each destination location. As discussed above, the list of source memory locations is commonly referred to as a DMA gather list shown as list 508. The list of destination disk locations will be referred herein as a disk scatter list shown as list 510. The DMA disk controller 506 collects a specified number of data blocks from memory locations within the DMA gather list 508 and distributes the collected data blocks to multiple distinct regions on one or more disks 504 according to the disk scatter list 510.

Referring to FIG. 5B, a DMA disk controller 530 receives a write command identifying a list of source locations on disks 524 with a number of data blocks to be collected from each source location and a list of destination locations in memory 522 with the size of a data portion to be written to each destination location. As discussed above, the list of destination memory locations is commonly referred to as a DMA scatter list shown as list 522. The list of source disk locations will be referred herein as a disk gather list shown as list 526. The DMA disk controller 530 collects a specified number of data blocks from multiple distinct regions on one or more disks 524 according to the disk gather list 526 and distributes the collected data blocks to the locations in memory 520 according to the DMA scatter list 522.

Referring to FIG. 5C, a DMA disk controller 540 receives a command to perform a composite disk/memory data transfer. The data transfer command identifies a set of source locations referred to herein as a composite gather list 546 and a set of destination locations referred to herein as a composite scatter list 548. Each set of locations includes a specific combination of distinct locations in memory 542 and distinct regions on one or more disks 544. The DMA disk controller 540 collects a specified number of data blocks from multiple distinct regions on one or more disks 524 and multiple locations in memory 542 according to the composite gather list 546 and distributes the collected data blocks to a different set of distinct disk locations and memory locations according to the composite scatter list 548.

Several features pertaining to the operation of a DMA disk controller will now be described in more detail with reference to FIG. 5C. It should be noted that the features described below are not limited to the embodiment illustrated in FIG. 5C but are applicable to any embodiment described herein (e.g., embodiments of FIGS. 5A and 5B).

Referring to FIG. 5C, if the total number of data blocks specified by the gather list 546 is not equal to the total number of data blocks specified by the scatter list 548, the requested operation is not carried out, and an error code is signaled by the DMA disk controller 540.

The DMA disk controller 540 reads data from certain locations specified in the gather list 546 and then writes this data to corresponding locations specified in the scatter list 548 (unless a corresponding location in the scatter list 548 is identified by a no-capture specifier). In other words, the block that is in position i in the gather list 546 is always written to the location that appears in position i in the scatter list 548 unless the i th location in the scatter list 548 is identified by a no-capture specifier requiring that no data be written to this location.

In one embodiment, the DMA disk controller 540 reads data from the locations specified in the gather list 546, in the specified spatial order, and then writes this data to the locations specified in the scatter list 548, in the specified spatial order. That is, the DMA disk controller 540 reads the i th block in the gather list 546 before reading the (i+1) th block in the gather list 546 and writes the i th block to the i th location in the scatter list 548 before writing the (i+1) th block to the (i+1) th location in the scatter list 548. The DMA disk controller 540 may finish reading all the blocks in the gather list 546, in the spatial order, before starting to write the blocks to the scatter list 548, in the spatial order. Alternatively, the DMA disk controller 540 may read each block in the order it appears in the gather list 546 and immediately write this block to the corresponding location in the scatter list 548.

In another embodiment, the DMA disk controller 540 defines a different order for reading blocks (as compared to the order in which the blocks appear in the gather list 546) and/or a different order (as compared to the order in which the locations appear in the scatter list 548) for writing blocks to locations within the scatter list 548. For example, the DMA disk controller 540 may decide to issue all read requests to the disk locations specified in the gather list 546 before issuing read requests to the cache locations in the scatter list 548, in order to mask the longer latency of disk operations. In addition, the DMA disk controller 540 may finish reading all the blocks in the gather list 546, in a newly-defined reading order, before starting to write the blocks to the scatter list 548, in a newly-defined writing order. Alternatively, the DMA disk controller 540 may read each block from the gather list 546 in a newly-defined reading order and immediately write this block to the corresponding location in the scatter list 548.

In yet other embodiments, the DMA disk controller 540 may perform individual read and write operations using any order combinations other than those described above.

In any of the above embodiments, if a specific location appears in both the gather list 546 and the scatter list 548, the DMA disk controller 540 first fetches a copy of the old data in this specific location and then overwrites the specific location with new data.

A memory location specifier may include the memory address and the length of a data portion. A disk location specifier may include the disk identifier, the block address, and the count of data blocks. In one embodiment, each of the gather list 546 and the scatter list 548 includes a combination of memory location specifiers and disk location specifiers. In another embodiment, the scatter list 548 may also include a no-capture specifier (e.g., a NULL specifier with the size of a portion to be skipped). When the DMA disk controller 540 encounters a no-capture specifier in the scatter list 548, the DMA disk controller 540 skips the specified portion in the gathered data stream, and then continues writing to the next location in the scatter list 548.

In one embodiment, the DMA disk controller 540 is configured to detect a duplicate location in the gather list 546 or the scatter list 548 and to skip reading or writing to the duplicate location for higher efficiency. Alternatively, the DMA disk controller 540 is configured to perform individual read or write operations regardless of duplications.

In one embodiment, the data transfer command also identifies one or more target locations for one or more sets of parity data. The sets of parity data may include, for example, an XOR value and an inverted value of the XOR value. For example, when writing a RAID stripe {A, B, C, D}, the RAID controller may require to record two parity blocks for additional safety as follows:

P=A XOR B XOR C XOR D, and Q=invert of P.

The size of each set of parity data is equal to the size of the data-transfer block. In one embodiment, each target location is identified by a memory location specifier or a disk location specifier. In another embodiment, each target location may also be identified by a no-capture specifier. By using the no-capture specifier, the array controller may require that no parity data be calculated and stored or that only a specific set of parity data be calculated and stored.

Some exemplary applications of the embodiments described above will now be discussed using "Xd" to indicate a disk location, "Xc" to indicate a cache memory location, and "X" to indicate either a disk location or a cache memory location. In particular, a DMA disk controller may fetch data from disks to a cache without generating parity data using the following input parameters specified by the array controller:

Gather list={Ad, Bd, Cd, Dd},
Scatter list={Ac, Bc, Cc, Dc}, and
XOR destination=NULL.

In another example, the DMA disk controller may execute a RAID-5 stripe command involving the generation of parity data using the following input parameters specified by the RAID controller:

Gather list={Ac, Bc, Cc, Dc},
Scatter list={Ad, Bd, Cd, Dd}, and
XOR destination=Pd.

In yet another example, the DMA disk controller may perform a log write by dumping a collection of data blocks onto a contiguous region on disk using the following input parameters specified by the array controller:

Gather list={Ac, Bc, Cc, Dc},
Scatter list={Ld}, where Ld is a contiguous disk region serving as a log, and
XOR destination=NULL.

The log write may be done for a variety of reasons, e.g., for salvaging cached data on a panic or consolidating a number of otherwise random writes into a sequential disk access for higher performance. Optionally, the XOR result may also be written to a certain location to afford some protection.

In still another example, the DMA disk controller may perform a mirrored write (i.e., duplicate data onto two disks) using the following input parameters specified by the RAID controller:

Gather list={Ac, Ac} (because the same data is to be written onto two disks, the source memory location is repeated),
Scatter list={Ad, Bd}, and
XOR destination=NULL.

In yet another example, the DMA disk controller may update a disk value with a corresponding cache value, calculate a new parity value, and update the old parity value with the new parity value. The input parameters specified by the RAID controller may be as follows:

Gather list={Ad, Ac, Pd}, where Ac is a cached version of the Ad data block on disk which is part of a RAID-5 stripe,
Scatter list={NULL, Ad, NULL}, and
XOR destination=Pd.

Accordingly, the DMA disk controller destages Ac into Ad on disk and updates the parity block on disk with the new parity value which may be calculated as follows:

P=Ad XOR Ac XOR Pd.

In this example, the same behavior will result if the DMA disk controller reads the three blocks in the gather list in any order (i.e., in the specified order or any other order) and writes the three blocks to the locations in the scatter list in any order (i.e., in the specified order or any other order). However, the DMA disk controller must have already read the old Ad and Pd blocks before it overwrites those locations with new data.

In still another example, the DMA disk controller may overwrite a specific location with different data multiple times using the following input parameters specified by the array controller:

Gather list={A, B, C, D, E}, and
Scatter list={G, G, G, G, G}.

The use of duplicate locations may be beneficial for an application attempting to thoroughly erase a block on the disk drive in a high security environment, in which a disk block is considered safely erased only after it has been overwritten a prescribed number of times using a predetermined sequence of data patterns.

In yet another example, the DMA disk controller may write a preconfigured data pattern to each destination location using the following input parameters specified by the array controller:

Gather list={NULL, NULL, NULL, NULL, NULL}, where NULL is a pre-configured data pattern, and Scatter list={A, B, C, D, E}.

This may be useful, for example, when an application needs to initialize the disk blocks to a know pattern (e.g., all zeroes).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method for operating a direct memory access (DMA) disk controller, the method comprising:
    receiving a data transfer command identifying one or more locations in memory and a set of regions on a plurality of disks accessible to the DMA disk controller, the set of regions comprising noncontiguous regions on any one of the plurality of disks;
    transferring data from the set of regions on the plurality of disks to the one or more locations in memory according to the data transfer command; and wherein:
    the data transfer command further identifies a target location for parity data;
    transferring data comprises calculating the parity data for the data to be transferred and writing the parity data to the target location; and
    the target location for parity data is identified by any one of a memory location specifier, a disk location specifier and a no-capture specifier, the no-capture specifier indicating that the parity data is not to be written.

2. The method of claim 1 wherein:
    the data transfer command is any one of a read command and a write command; and
    the method further comprises collecting data from the set of regions on the plurality of disks and distributing the collected data to the one or more locations in memory.

3. The method of claim 1 wherein:
    the data transfer command is any one of a read command and a write command;
    the set of regions on plurality of disks represents a set of destination locations;
    the one or more locations in memory represents one or more source locations; and
    transferring data comprises collecting data from the set of source locations and distributing the collected data to the one or more destination locations.

4. The method of claim 1 further comprising determining that a total number of data blocks associated with the set of regions on the plurality of disks is equal to a total number of data blocks associated with the one or more locations in memory.

5. The method of claim 1 further comprising:
    generating result code indicating whether the data transfer has completed successfully.

6. A method for operating a direct memory access (DMA) disk controller, the method comprising:
    receiving a data transfer command identifying one or more locations in memory and a set of regions on a plurality of disks accessible to the DMA disk controller, the set of regions comprising noncontiguous regions on any one of the plurality of disks;
    transferring data from the set of regions on the plurality of disks to the one or more locations in memory according to the data transfer command; and
    detecting a duplicate location within any of the set of regions on the plurality of disks and the one or more locations in memory.

7. The method of claim 6 further comprising:
    skipping the duplicate location when executing the data transfer command.

8. A method for operating a direct memory access (DMA) disk controller, the method comprising:
    receiving a command to transfer data from a set of source locations to a set of destination locations, wherein at least one set of the set of source locations and the set of destination locations includes a combination of one or more disk locations and one or more memory locations, the one or more disk locations comprising noncontiguous regions on any one of at least one disk and wherein the command to transfer data is associated with information comprising a gather list identifying the set of source locations and a scatter list identifying the set of destination locations;
    executing the command by collecting data from the set of source locations and distributing the collected data to the set of destination locations;
    detecting a no-capture specifier in the scatter list;
    skipping a corresponding location in the gather list; and
    continuing writing to a next location within the scatter list.

9. The method of claim 8 further comprising determining that a total number of data blocks associated with the set of source locations is equal to a total number of data blocks associated with the set of destination locations.

10. The method of claim 8 wherein:
    the information further comprises a target location for storing parity data; and
    executing the command further comprises calculating the parity data based on the gather list and storing the parity data in the target location.

11. The method of claim 8 wherein the execution of the command is performed based upon an order of source locations within the gather list and an order of destination locations within the scatter list.

12. The method of claim 8 wherein the execution of the command is performed regardless of an order of locations within any of the scatter list and the gather list.

13. The method of claim 8 wherein the command to transfer data is any one of a write command and a read command.

14. A method for operating a direct memory access (DMA) disk controller, the method comprising:
    receiving a command to transfer data from a set of source locations to a set of destination locations, wherein at least one set of the set of source locations and the set of destination locations includes a combination of one or more disk locations and one or more memory locations, the one or more disk locations comprising noncontiguous regions on any one of at least one disk and wherein the command to transfer data is associated with information comprising a gather list identifying the set of source locations and a scatter list identifying the set of destination locations;
    executing the command by collecting data from the set of source locations and distributing the collected data to the set of destination locations;
    detecting a pattern specifier in the gather list; and
    writing a pre-configured data pattern to a corresponding location in the scatter list.

15. A device to operate as a direct memory access (DMA) disk controller, the device comprising:
- command receiving logic to receive a data transfer command identifying one or more locations in memory and a set of regions on a plurality of disks accessible to the DMA disk controller, the set of regions comprising noncontiguous regions on any one of the plurality of disks;
- data manipulation logic to transfer data from the set of regions on the plurality of disks to the one or more locations in memory according to the data transfer command;
- an XOR engine to calculate parity data for the data to be transferred, the parity data being written to a target location identified by the data transfer command; and
- wherein the target location for parity data is identified by any one of a memory location specifier, a disk location specifier and a no-capture specifier, the no-capture specifier indicating that the parity data is not to be written.

16. The device of claim 15 wherein the command receiving logic is further to determine that a total number of data blocks associated with the set of regions on the plurality of disks is equal to a total number of data blocks associated with the one or more locations in memory.

17. The device of claim 15 further comprising a result code generator to generate a result code indicating whether the data transfer has completed successfully.

18. A device to operate as a direct memory access (DMA) disk controller, the device comprising:
- command receiving logic to receive a command to transfer data from a set of source locations to a set of destination locations, wherein at least one set of the set of source locations and the set of destination locations includes a combination of one or more disk locations and one or more memory locations, the one or more disk locations comprising noncontiguous regions on any one of at least one disk and wherein the command to transfer data is associated with information comprising a gather list identifying the set of source locations and a scatter list identifying the set of destination locations; and
- data manipulation logic to execute the command by collecting the data from the set of source locations and distributing the collected data to the set of destination locations, wherein the data manipulation logic is to execute the command by detecting a no-capture specifier in the scatter list, skipping a corresponding location in the gather list, and continuing writing to a next location within the scatter list.

19. The device of claim 18 further comprising an XOR engine to calculate parity data based on the gather list, the parity data being written to a target location specified by the associated information.

20. A device to operate as a direct memory access (DMA) disk controller, the device comprising:
- command receiving logic to receive a command to transfer data from a set of source locations to a set of destination locations, wherein at least one set of the set of source locations and the set of destination locations includes a combination of one or more disk locations and one or more memory locations, the one or more disk locations comprising noncontiguous regions on any one of at least one disk and wherein the command to transfer data is associated with information comprising a gather list identifying the set of source locations and a scatter list identifying the set of destination locations; and
- data manipulation logic to execute the command by collecting the data from the set of source locations and distributing the collected data to the set of destination locations, wherein the data manipulation logic is to execute the command by detecting a pattern specifier in the gather list, and writing a pre-configured data pattern to a corresponding location in the scatter list.

* * * * *